Sept. 11, 1923.

A. P. LEE

DUMPING VEHICLE

Filed April 12, 1919

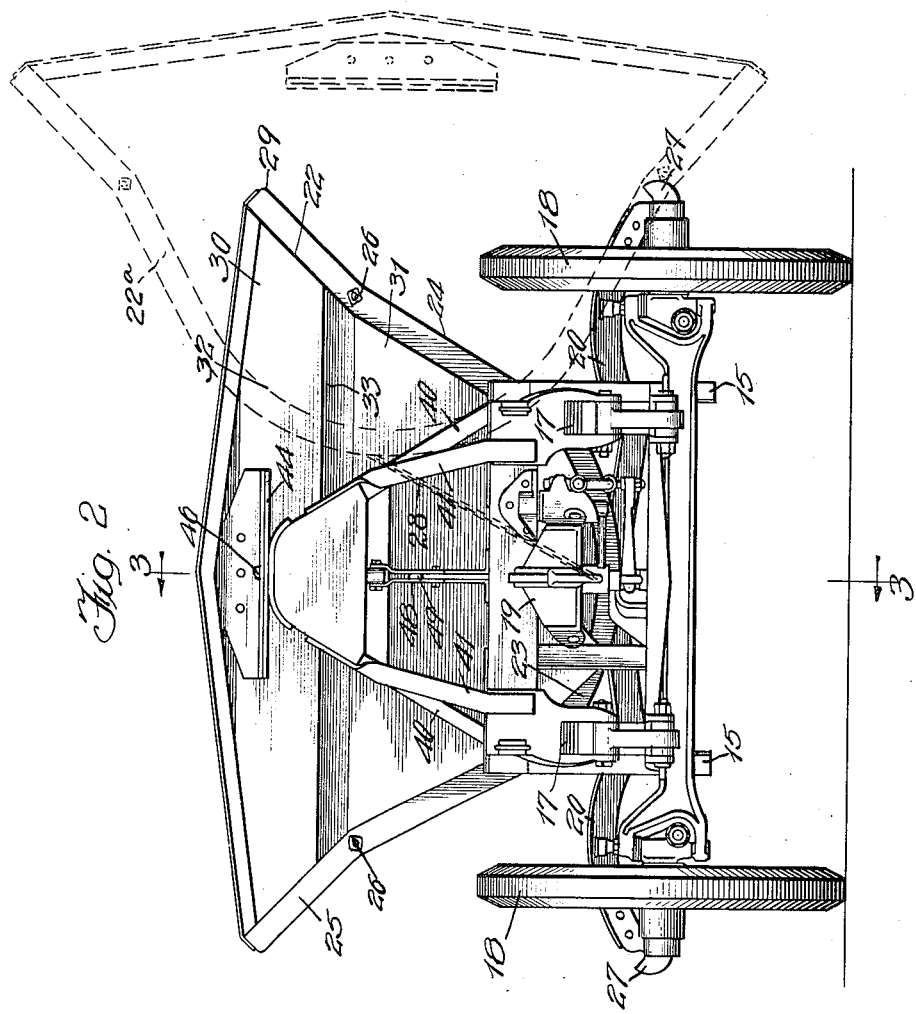

Sept. 11, 1923.   1,467,485
A. P. LEE
DUMPING VEHICLE
Filed April 12, 1919   6 Sheets-Sheet 3
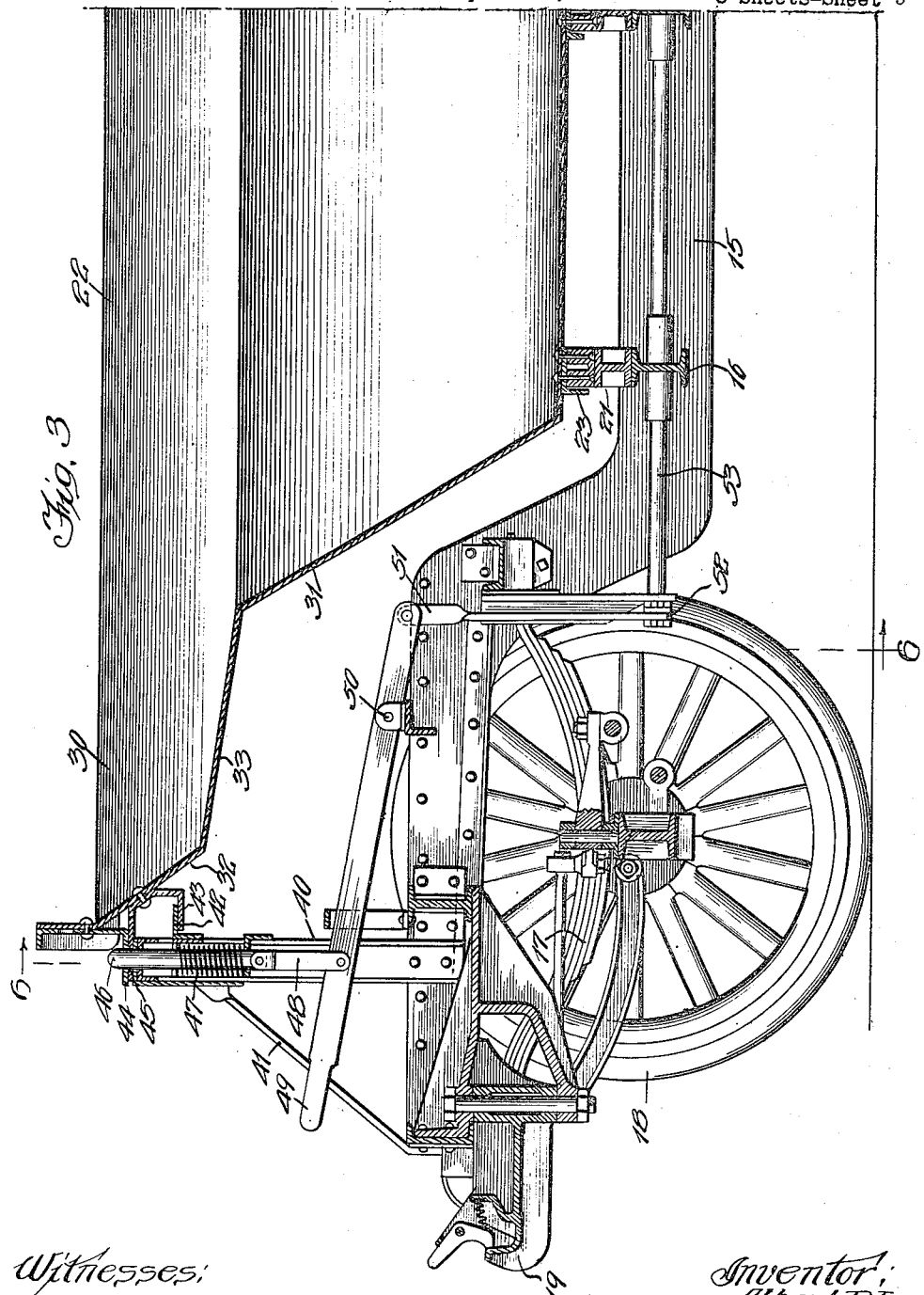

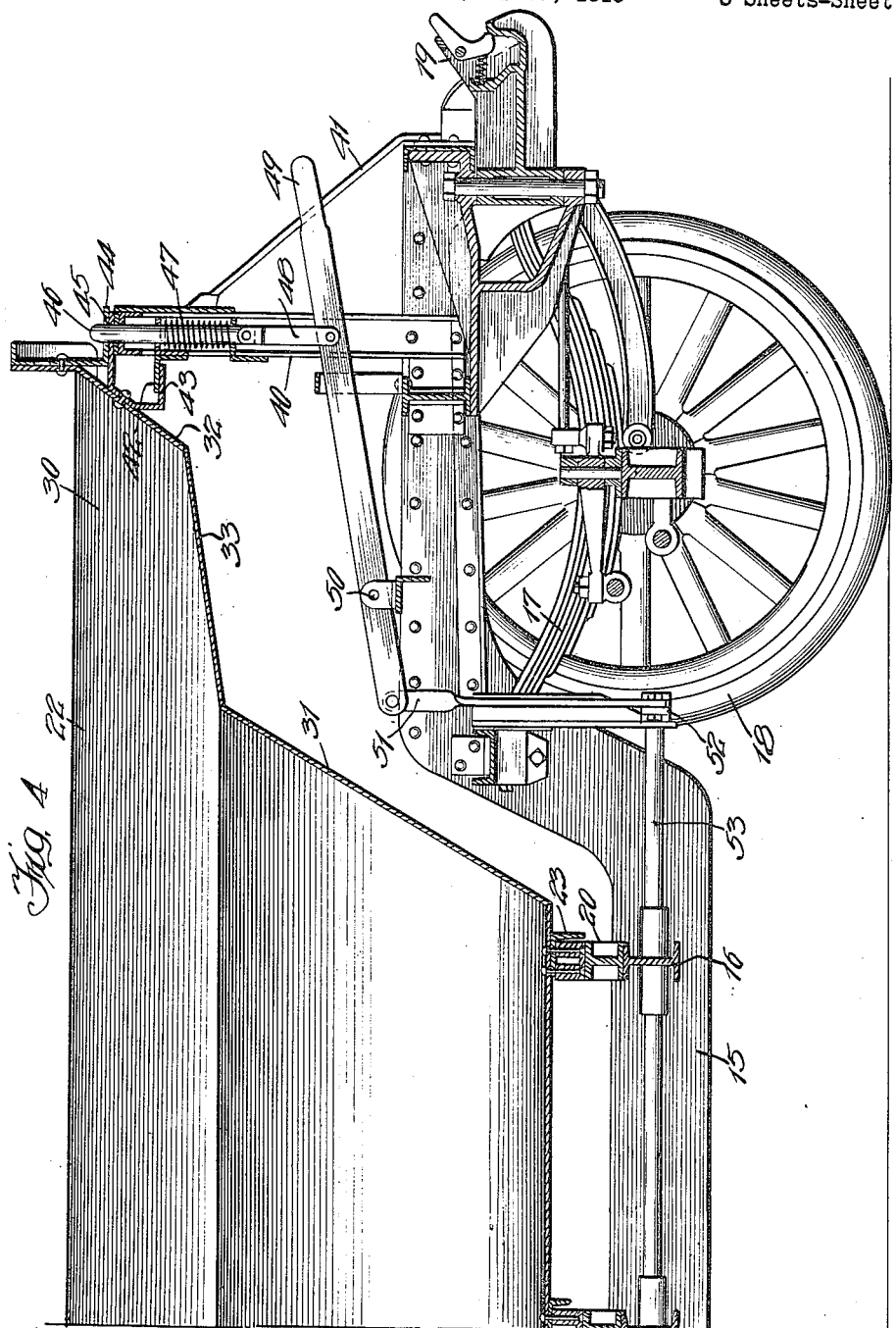

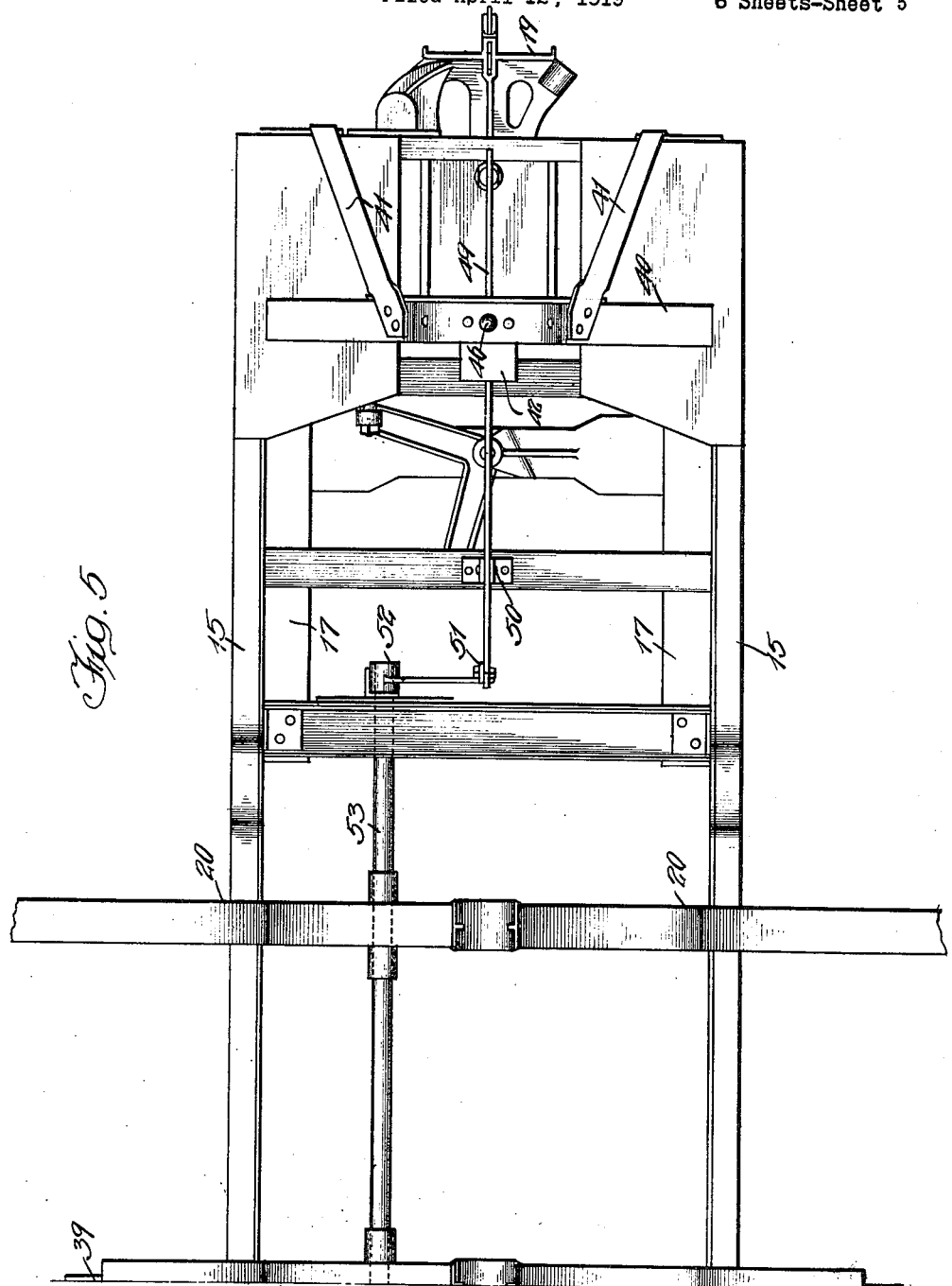

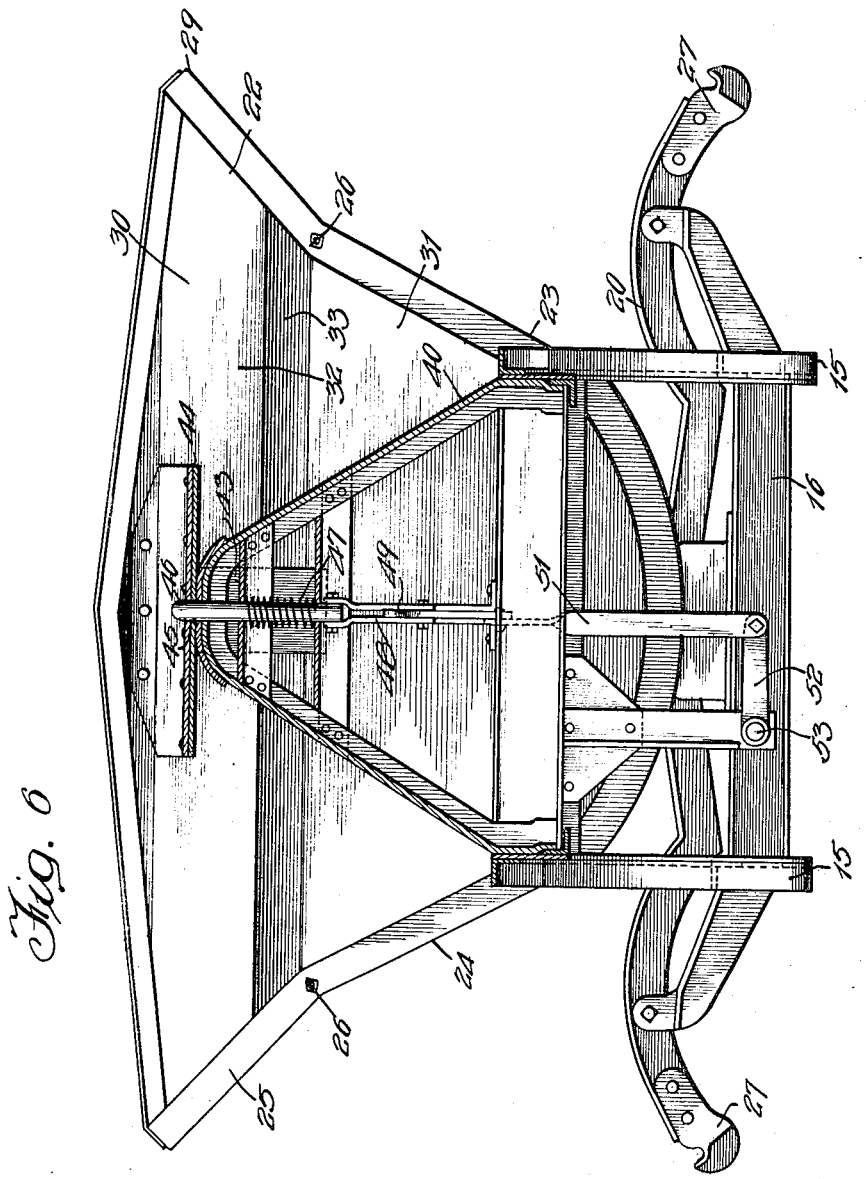

Patented Sept. 11, 1923.

1,467,485

UNITED STATES PATENT OFFICE.

ALBERT PRESTON LEE, OF CHICAGO, ILLINOIS, ASSIGNOR TO LEE LOADER & BODY CO., OF CHICAGO, ILLINOIS.

DUMPING VEHICLE.

Application filed April 12, 1919. Serial No. 289,488.

*To all whom it may concern:*

Be it known that I, ALBERT P. LEE, a citizen of the United States, residing at Chicago, in the county of Cook and State of Illinois, have invented a certain new and useful Improvement in Dumping Vehicles, of which the following is a full, clear, concise, and exact description, reference being had to the accompanying drawings, forming a part of this specification.

My invention relates to dumping vehicles and has for its object the provision of a vehicle which carries a hopper, which hopper is movable from an upright charge carrying position to a dumping position in order to discharge the contents.

It is a prime object of my invention to provide a construction of this nature in which the hopper is mounted much lower than has heretofore been possible, preferably by the utilization of what I might call a drop frame so that the center of gravity of the vehicle is quite low. The hopper, however, is of such construction, preferably through the use of one or more overhanging ends whereby the center of gravity of the hopper is higher than it would be if the hopper did not have such overhanging ends.

The preferred form of the hopper is one substantially as shown in my co-pending application Serial No. 142,419, filed January 15, 1917, so far as the cross-section of the hopper is concerned, the structure however being modified in accordance with the dictates of this invention.

In general, such a hopper has a rounded bottom with abruptly inclined sides, the upper extremity of the sides then flaring outwardly to provide a discharge mouth or snout. That part of the interior of the hopper between the flaring side portions usually carries a great amount of the loose material and thus normally maintains a high center of gravity for the complete hopper, both when filled and unfilled. By reason of the structure, however, as herein disclosed whereby the hopper is mounted very much lower than heretofore, it is very undesirable to have the flaring portions of the sides of very great length, as otherwise the upper edge thereof would strike the ground when the hopper is being dumped. For this reason an overhanging end or overhanging ends are provided at the upper portion of the hopper to compensate for the reduced length of the flaring side portions. It must be understood however that I do not limit the use of such overhanging ends to hoppers having restricted flaring side portions for the reason that the overhanging end feature serves many useful purposes, regardless of the particular hopper construction.

My invention further contemplates improved means for locking the hopper in its central position and for holding it in such a manner that it does not leave the runway upon which it is movable from one position to another.

I will explain one form which my invention may take more in detail by referring to the accompanying drawings illustrating the same, in which Fig. 1 is a side view of a vehicle constructed in accordance with my invention;

Fig. 2 is an end view thereof;

Fig. 3 is a sectional view on line 3—3 of Fig. 2 of the front half of the vehicle;

Fig. 4 is a similar view of the rear half thereof;

Fig. 5 is a top view of the portion of the device shown in Fig. 4, and

Fig. 6 is a sectional view on line 6—6 of Fig. 3.

My improved vehicle consists of a framework having the side bars 15, 15 suitably held together by cross-channels 16, 16 and suitably braced in other ways to provide a substantial structure. Springs 17 are mounted on the framework in any suitable manner and co-operate with the vehicle wheels 18, 18. Suitable draw bar heads 19 are also carried by the framework so that the vehicle may be attached to any other vehicle, if desired, the particular illustration herein showing my invention as applied to a trailer, although it of course will be obvious that my invention is not limited to trailers.

The framework also carries rails 20 and 21 which are constructed and associated with the framework substantially in the manner disclosed in my aforesaid co-pending application. These rails co-operate with the dumping hopper 22, the construction of which will be more readily seen from Fig. 2, this hopper having the rounded bottom 23, the abruptly inclined sides 24, 24 and the flaring side portions 25, 25 which provide the discharge mouth.

In the illustration herein I have shown my structure as applied to a hopper which occupies the central position shown in Fig. 2 where it is carrying the load and which may roll in both directions from the central position into limiting positions in order to discharge the contents, one of these limiting positions being shown in dotted lines at 22$^a$ in Fig. 2.

I, of course, do not wish to limit my invention to a two-way dumping hopper as various features of my invention are equally applicable to a hopper which may dump to only one side of its normal position.

The hopper is provided with pivot pins 26 which pivot pins co-operate with fingers 27 provided at the extremities of the rails 20 and 21, so that the hopper may partake of a substantial pivotal movement about these pins into its extreme limiting position after it has completed its rolling movement upon the rails 20 and 21. Suitable chains 28 limit the pivotal movement of the hopper and prevent its movement beyond the predetermined dumping position desired.

In order to obtain a vehicle which shall be extremely low and which shall have a low center of gravity, which is particularly desirable for trailers, the side frames 15 are bent downwardly, as shown more clearly in Fig. 1, at those portions thereof between the wheels 18 and which form what I might call a drop frame construction. The rails 20 and 21 are thus extremely low and the hopper itself is very low, being thus close to the ground and thus providing a vehicle of a very low center of gravity, thus to insure great stability and also to provide a vehicle which when completed is not high. As this hopper is mounted very low it is obvious that the height of the hopper itself cannot be more than a predetermined amount because if it were too high, then the edge 29 (Fig. 2) would touch the ground. It must be understood also that it is not only necessary to have the hopper when in its dumping position clear the ground, but it is necessary to have an ample clearance space between the edge 29 and the ground in order to permit proper withdrawal of the hopper from the dumped material and to prevent the hopper edge 29 from hitting obstructions that might be adjacent to the vehicle when it is being dumped. In order to keep the height of the hopper as low as possible, the flaring side portions 25 must be restricted in height. It is not wise to restrict the height of the abruptly inclined side portions 24 for the reason that any restriction of the height of these side portions 24 would decrease the travel which is permitted the hopper from its central to its discharge position. It is of great importance that the contents of the hopper be discharged as far away from the vehicle to the side thereof as may be possible in order to clear the wheels and for other purposes. For this reason the hopper conveys the contents to the side of the vehicle when it is discharging these contents and then dumps them at a point considerably remote from the wheels of the vehicle. It will be clear that any restriction of the height of the hopper portions 23, 24 will reduce the length of travel sidewardly of the hopper and thus reduce the distance that the materials are carried sidewardly prior to dumping. In order then to retain a high center of gravity for the hopper itself, even though the flaring side portions 25, 25 may be restricted in height, I provide overhanging end portions 30, 30 which form part of the hopper and are adapted to receive and carry additional material at the upper portion of the hopper proper so as to keep a high center of gravity. The overhanging end portions are given a considerable clearance above the framework, as is clearly apparent from Fig. 1 and this clearance is of such a nature that these overhanging end portions do not strike the wheels when the hopper is being dumped. It will be noted also that the ends of the hopper are inclined, as shown at 31, and that the upper ends of the hopper are inclined, as shown at 32. Likewise, the bottom of the overhanging ends is inclined, as shown at 33. By thus constructing the hopper ends all of the practical available space is utilized and yet the hopper construction is of such a nature that the dumping operation may take place without having any portion of the hopper strike either the wheels or other portions of the vehicle framework.

By virtue of this arrangement I secure, as stated, a vehicle having a low center of gravity, together with a substantially low hopper having the requisite high center of gravity.

The sides of the hopper are provided with hooks 34 which co-operate with suitable levers 35 carried by the chains 36 in order to hold the hopper in its central position. These chains are suitably backed by the springs 37 to provide the necessary resilience and the lower extremities of the springs are carried by suitable eyes 38 mounted upon studs 39 projecting outwardly from the framework of the vehicle. The framework also carries suitable uprights 40 at its extremities, which uprights are adequately braced by the braces 41. These uprights each carry flanges 42 adapted to cooperate with interlocking flanges 43 carried by the hopper. The flanges 43 are rounded so that they slide readily into place under the flanges 42. When the hopper is in its central position, these elements 42 and 43 hold the hopper down against the rails and prevent it flying upwardly when the vehicle is passing obstructions in the road or at any other time when such a tendency might be present. The hopper ends are also provided with projections 44, which projections have a central aperture 45 through which a bolt 46 may project when the hopper is in its central position. These bolts 46 hold the hopper in its central position, thus aiding the locking devices co-operating with the hooks 34. The bolts 46 are spring pressed upwardly by the springs 47 so that the bolts are always forced into their locking position whenever the hopper is in its central position. The spring structure also permits the wide flaring shelf portion 44, when the hopper is returning to its central position, to slide over the top of the bolt 46 until the hopper is in its central position, whereupon the bolts 46 are pushed upwardly by the springs 47 into their locking position, thus making the locking feature substantially automatic. The bolts 46 are by means of links 48 united with levers 49, which levers are pivoted at 50. These levers by means of links 51 are connected to arms 52 projecting outwardly from the rotatable rod 53. This rod 53 is rotatably carried in the framework. It will be seen that there are two handles 49 provided and they both move in unison by reason of the lever and bar connections just referred to so that the hopper may be unlocked, that is, the bolts 46 withdrawn from their locking position by an actuation of either lever 49. The means which unlock the bolts 46 are thus operable from either extremity of the vehicle.

From what has been thus described the nature of my invention will be clearly understood. It will also be understood that changes and modifications may be made within the scope of the appended claims without departing from the spirit of my invention.

Having however thus described one form which my invention may take, what I claim as new and desire to secure by Letters Patent is:

1. A device of the character described comprising a rolling hopper, a downwardly bent framework upon which said hopper is adapted to roll between charge carrying and discharge positions, and wheels supporting the framework, said hopper having at one extremity an upper longitudinally extending overhanging load-carrying extension, and the end walls of said hopper and extension flaring outwardly.

2. A device of the character described comprising a rolling hopper, and a framework upon which said hopper is adapted to roll between charge carrying and discharge positions, said hopper having at one extremity an upper longitudinally extending overhanging load-carrying extension, the floor of said extension sloping downwardly toward the hopper proper, and the end wall of said hopper flaring outwardly.

3. A device of the character described comprising a rolling hopper, and a framework upon which said hopper is adapted to roll between charge carrying and discharge positions, said hopper having at one extremity an upper longitudinally extending overhanging hollow load-carrying extension, the floor of said extension sloping downwardly toward the hopper proper, and the end walls of said hopper and extension flaring outwardly.

4. A device of the character described comprising a vehicle having a drop frame, a rolling hopper adapted to roll on said frame between charge carrying and discharge positions, said hopper having an outwardly flaring side wall and a more acutely flaring discharge mouth surmounting said side wall, and a longitudinal load-carrying extension provided upon said hopper at the top thereof and projecting over the end of the drop frame.

5. A device of the character described comprising a vehicle having a drop frame, a rolling hopper adapted to roll on said frame between charge carrying and discharge positions, said hopper having an outwardly flaring side wall and a more acutely flaring discharge mouth surmounting said side wall, and a longitudinal load carrying extension provided upon said hopper at the top thereof projecting over the end of the drop frame, said extension having an inclined end wall.

6. A device of the character described comprising a vehicle having a drop frame, a rolling hopper adapted to roll on said frame between charge carrying and discharge positions, said hopper having an outwardly flaring side wall and a more acutely flaring discharge mouth surmounting said side wall, and a longitudinal load carrying extension provided upon said hopper at the top thereof projecting over the end of the drop frame, said extension having an inclined end wall, said hopper having an inclined end wall and said extension having an inclined bottom connecting said end walls.

In witness whereof, I hereunto subscribe my name this 31st day of March, A. D., 1919.

ALBERT PRESTON LEE.